(12) United States Patent
Wittig et al.

(10) Patent No.: US 7,610,931 B2
(45) Date of Patent: Nov. 3, 2009

(54) BYPASS VALVE WITH AN INTEGRAL FLOW SENSOR FOR A WATER TREATMENT SYSTEM

(76) Inventors: Mark Wittig, 10135 Scepter Cir., Franklin, WI (US) 53132; Kenneth Sieth, 2730 Peninsula Dr., Delafield, WI (US) 53018; Thomas Honzelka, 1605 Navajo St., Grafton, WI (US) 53024

( * ) Notice: Subject to any disclaimer, the term of this patent is extended or adjusted under 35 U.S.C. 154(b) by 345 days.

(21) Appl. No.: 11/349,755

(22) Filed: Feb. 8, 2006

(65) Prior Publication Data

US 2007/0181191 A1 Aug. 9, 2007

(51) Int. Cl.
*F16K 11/20* (2006.01)
*F16K 5/04* (2006.01)
*F16K 11/085* (2006.01)

(52) U.S. Cl. .................... 137/551; 137/597; 137/625.47
(58) Field of Classification Search ................ 137/551, 137/597, 625.47, 556.6; 73/198
See application file for complete search history.

(56) References Cited

U.S. PATENT DOCUMENTS

| | | | | |
|---|---|---|---|---|
| 3,045,697 A | * | 7/1962 | Seguenot | 137/864 |
| 3,244,002 A | * | 4/1966 | Prono et al. | 73/198 |
| 3,352,155 A | * | 11/1967 | Penet | 73/198 |
| 3,721,265 A | * | 3/1973 | Hoffland | 137/625.47 |
| 4,193,579 A | * | 3/1980 | Massey | 251/288 |
| 4,435,980 A | * | 3/1984 | Schmidt | 73/198 |
| 4,462,372 A | * | 7/1984 | Jackson | 123/452 |
| 4,972,877 A | | 11/1990 | Halemba et al. | |
| 5,139,050 A | * | 8/1992 | Otto | 137/625.29 |
| 6,347,644 B1 | | 2/2002 | Channell | |
| 6,560,790 B2 | * | 5/2003 | Saar et al. | 4/302 |
| 2005/0127317 A1 | * | 6/2005 | Rebello | 251/209 |

FOREIGN PATENT DOCUMENTS

WO    WO 99/07456    2/1999

\* cited by examiner

*Primary Examiner*—Stephen Hepperle
*Assistant Examiner*—William McCalister
(74) *Attorney, Agent, or Firm*—Quarles & Brady LLP; George E. Haas

(57) ABSTRACT

A bypass valve includes a body with first and second chambers connected by a bridge passage, an untreated water inlet and an untreated water outlet both open into the first chamber, and a treated water inlet and a treated water outlet both open into the second chamber. A first valve element is rotatably received in the first chamber alternately to connect the inlet to the untreated water outlet or the bridge passage. A second valve element is rotatably received in the second chamber alternately to connect the outlet to the treated water outlet or the bridge passage. A manually operable mechanism rotates the first valve element in the first chamber and the second valve element in the second chamber. A flow sensor is received within either the first or second valve element to measure the amount of water flowing through the bypass valve.

17 Claims, 3 Drawing Sheets

US 7,610,931 B2

BYPASS VALVE WITH AN INTEGRAL FLOW SENSOR FOR A WATER TREATMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to water treatment systems, and more particularly to bypass valves for the water treatment apparatus and sensors for measuring water flow through the treatment system.

2. Description of the Related Art

A water treatment system, such as a water softener or reverse osmosis filter, often is incorporated into the plumbing of a building. For example, potable water received from a well usually is considered to be "hard" as containing minerals that adversely affect the cleansing ability of soaps and detergents. Furthermore, the minerals leave objectionable deposits on plumbing fixtures, glassware and the like. As a consequence, a water softener or filter is employed to remove the minerals and "soften" the water.

Occasionally, it is necessary to perform maintenance on the water treatment system, such as replacing the filter medium or a failed component. In order to perform such maintenance, the water treatment apparatus must be functionally and sometimes physically disconnected from the building's plumbing system. However, while the maintenance is being performed, it is desirable to provide untreated water for use in the building for drinking, flushing toilets and other purposes. Therefore, a bypass valve is provided at the connection of the water treatment apparatus to the building plumbing system. The bypass valve disconnects both the inlet and the outlet of the treatment apparatus from the plumbing pipes and interconnects those pipes so that water is provided throughout the building while the maintenance is being performed.

Flow sensors, such as a turbine wheel connected to a transducer that produces an electric signal, have been incorporated into previous water treatment systems to indicate the amount of water flowing there through. The flow indicating signal is applied to a controller which provides a cumulative measurement of the volume of water that has been treated by the system, thereby indicating when maintenance on the water treatment system needs to be performed or in the case of a water softener when regeneration is required. Heretofore the flow sensors were either incorporated into the main control valve assembly of the water treatment apparatus or were in a separate housing that was placed in a pipe remote from water treatment apparatus. However, such remote location required additional plumbing connections and thus increased the labor costs and component costs associated with the water treatment system.

SUMMARY OF THE INVENTION

A bypass valve for a water treatment system includes a body having a first chamber and a second chamber connected by a bridge passage to the first chamber. The body also comprises an inlet that opens into the first chamber to receive untreated water, an untreated water outlet that opens into the first chamber, a treated water inlet that opens into the second chamber, and an outlet that opens into the second chamber and through which treated water exits the valve.

A first valve element is rotatably received in the first chamber. In a first position, the first valve element connects the inlet to the untreated water outlet. In a second position of the first valve element, the inlet is connected to the bridge passage and disconnected from the untreated water outlet. A second valve element is rotatably received in the second chamber. In a third position, the second valve element connects the outlet to the treated water inlet. In a fourth position of the second valve element, the outlet is connected to the bridge passage and disconnected from the treated water inlet. A manually operable mechanism is provided to rotate the first valve element in the first chamber and the second valve element in the second chamber.

Another aspect of the present bypass valve is the incorporation of a flow sensor into the first or second valve element. Preferably, a turbine is rotatably received in that valve element and a transducer produces an electrical signal in response to rotation of the turbine.

DESCRIPTION OF THE OF THE DRAWINGS

DETAILED DESCRIPTION OF THE INVENTION

Figure 1:
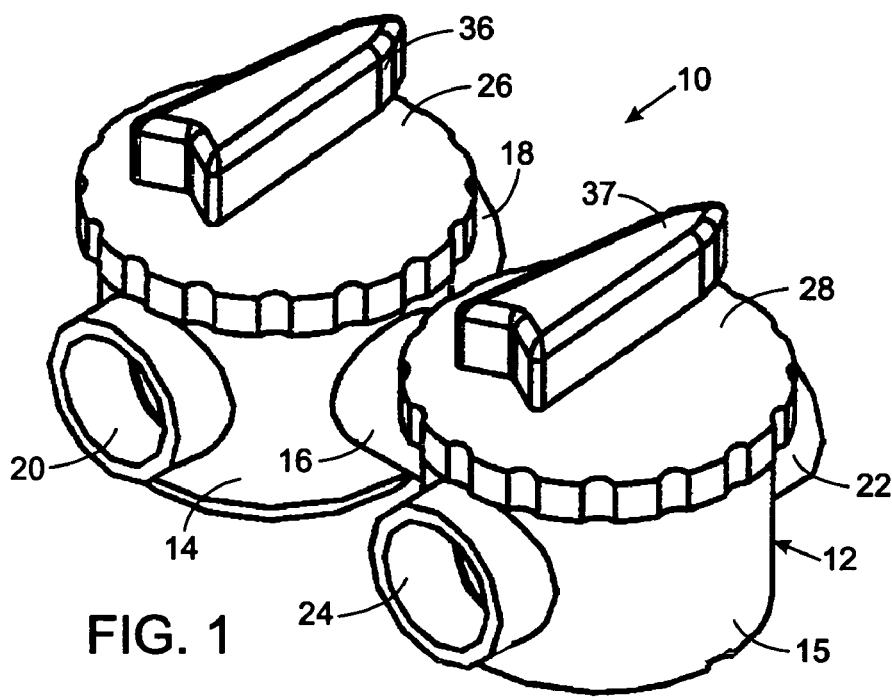
FIG. 1 is an isometric view of a bypass valve according to the present invention.

With initial reference to FIG. 1, a bypass valve 10 is provided to functionally disconnect a water treatment apparatus from the plumbing system of a building while still permitting water to be supplied throughout the building. The bypass valve 10 comprises a body 12 with first and second housings 14 and 15 connected by a tubular bridge 16. The first housing 14 has an inlet 18 adapted for connection to a pipe of the building plumbing system that supplies water to be treated by the water treatment system. A untreated water outlet 20 projects from the first housing 14 diametrically opposite to the inlet 18. Similarly, the second housing 15 has an outlet 22 projecting from the same side of the bypass valve 10 as the inlet 18. A treated water inlet 24 is located on the second housing 15 diametrically opposite to the outlet 22.

Figure 3:
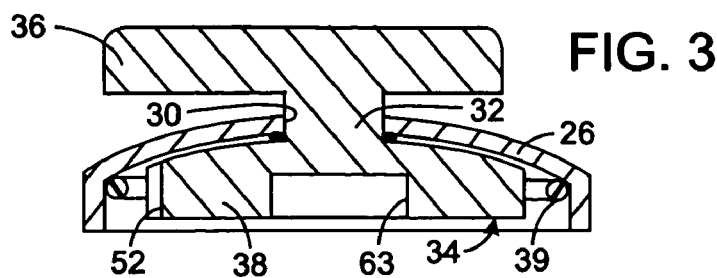
FIG. 3 is a cross section view through one of the cap assemblies on the bypass valve.

The first and second housings 14 and 15 have openings at their tops that are sealed by separate caps 26 and 28 of identical construction. Each cap 26 and 28 threads onto the outer circumferential surface of the respective first or second housing 14 and 15. The details of the first cap 26 are shown in FIG. 3. A rubber-sealing ring 39 is located inside the cap to engage the upper annular surface of the first respective housing 14 to prevent water from leaking there between. The first cap 26 has an aperture 30 centrally located in its dome through which a shaft 32 of a valve operator 34 extends. The upper end of the shaft 32 is connected to a member, such as a knob 36 or lever, which can be grasped and turned by a user to operate the bypass valve. The inner end of the actuator shaft 32 is affixed to a disk-shaped driver 38.

Figure 4:
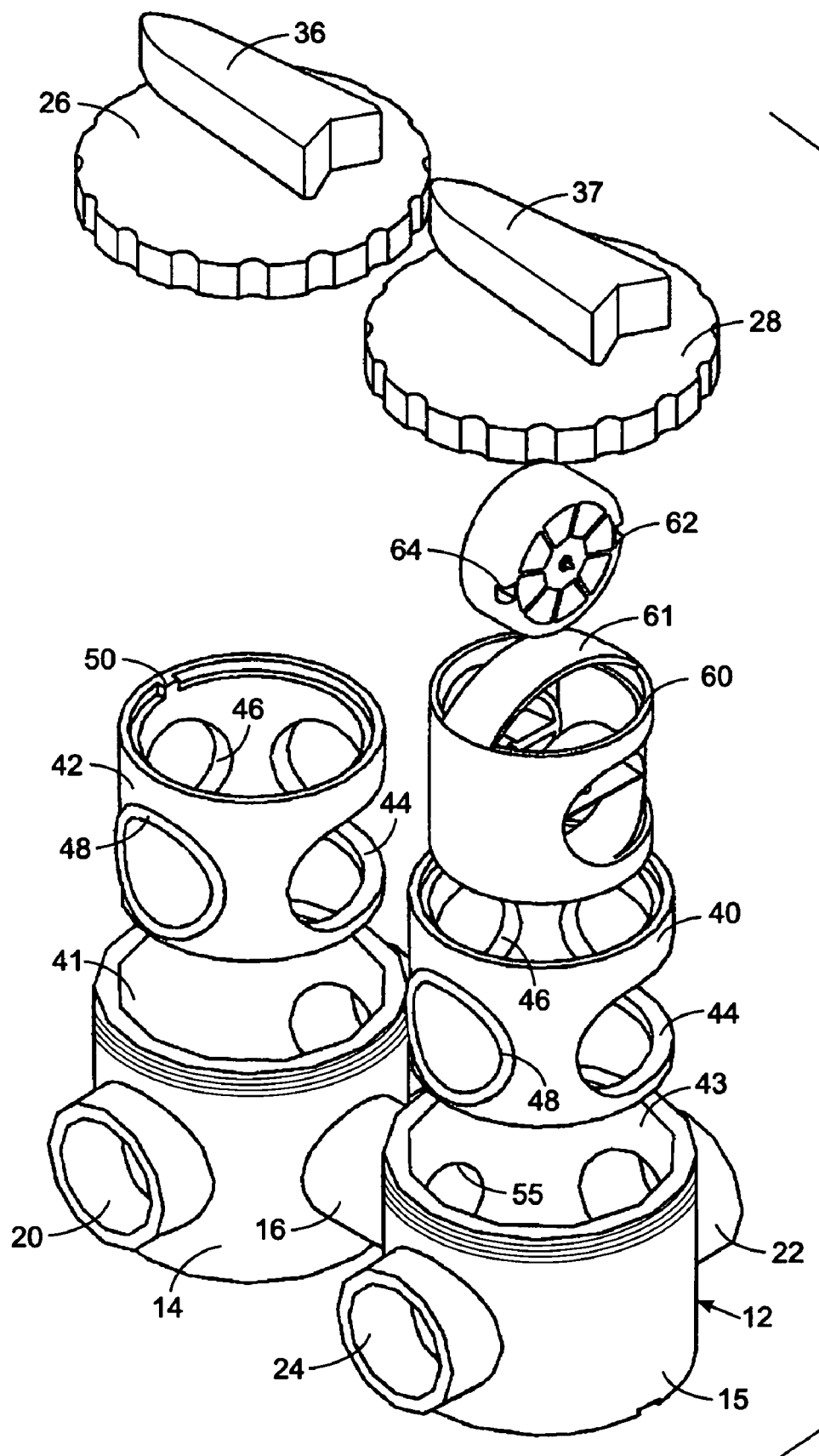
FIG. 4 is an exploded view illustrating the components of the bypass valve.

Referring to FIG. 4, the first housing 14 has a first chamber 41 into which the inlet, untreated water outlet and a passage 55 through the bridge 16 open. The second housing 15 has a second chamber 43 into which the outlet, treated water inlet and the bridge passage 55 open. Identical tubular first and second valve elements 40 and 42 are received respectively within the first and second chambers 41 and 43. Each element 40 and 42 has an elongated first aperture 44 that extends approximately 150 degrees around its curved outer surface. A circular second aperture 46 is located through that outer surface diametrically opposed to one end of the first aperture 44. A sealing ring 48 is received in an annular groove in the valve element's outer surface at a center-to-center spacing of 90 degrees from the second aperture 46.

A flow meter cage 60 is inserted into the tubular second valve element 42. Openings in the flow meter cage 60 align with the first and second apertures 44 and 46 allowing water to flow through both the second valve element 42 and the flow meter cage. The flow meter cage 60 has a cross member 61 that bows outward into a notch 63 in the driver 38 of the valve operator 34 shown in FIG. 3 so that rotation of the valve operator, as will be described, also rotates the flow meter cage. The cross member 61 fits tightly into the driver's notch so that the flow meter cage 60 is pulled out of the second valve member when the second cap 28 is removed from the second housing 15.

Figure 2:
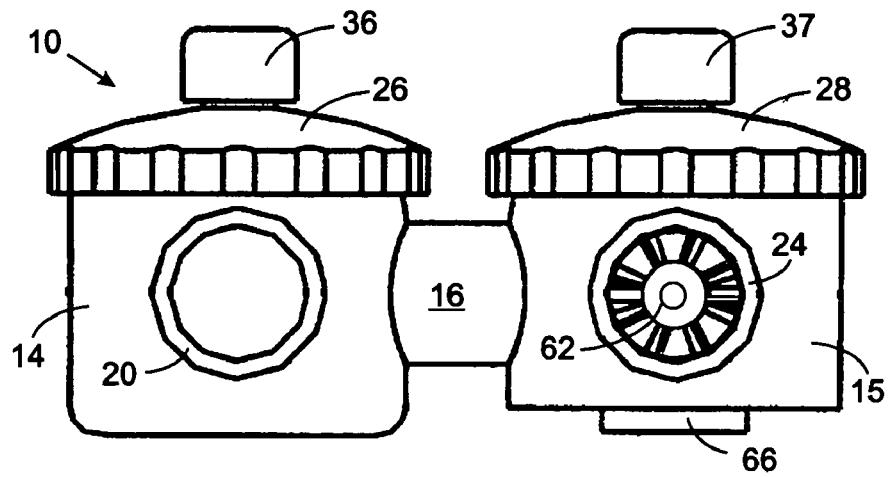
FIG. 2 is an elevational view of a side of the bypass valve to which connections to the building plumbing system are made.

A disk shaped turbine 62 is rotatably received within the flow meter cage 60 and spins therein under the flow of fluid through the second housing 15. A permanent magnet 64 is mounted on the turbine 62. A Hall effect sensor 66 is mounted on the bottom surface of the second housing 15 as shown in FIG. 2 and acts as a transducer producing an electrical signal pulse each time the permanent magnet 64 passed that sensor. Thus the electrical signal pulses can be counted by a conventional circuit in a well-known manner to produce a measurement of the amount of water flowing through the bypass valve.

Referring again to FIG. 4, the upper edges of the first and second valve elements 40 and 42, in the illustrated orientation, has a key 50, which is received within a recess 52 in the edge of the actuator driver 38 beneath its associated cap 26 or 28, as shown in FIG. 3. This engagement causes the valve element to rotate within the respective housing 14 or 15 when a user rotates the knob 36 or 37 on the associated cap 26 or 28. However, when a cap 26 or 28 is removed from the top of the respective first or second housing 14 or 15, the key 50 slides easily out of the recess 52, allowing the associated first or second valve element 40 or 42 to remain in the housing.

Figure 5:
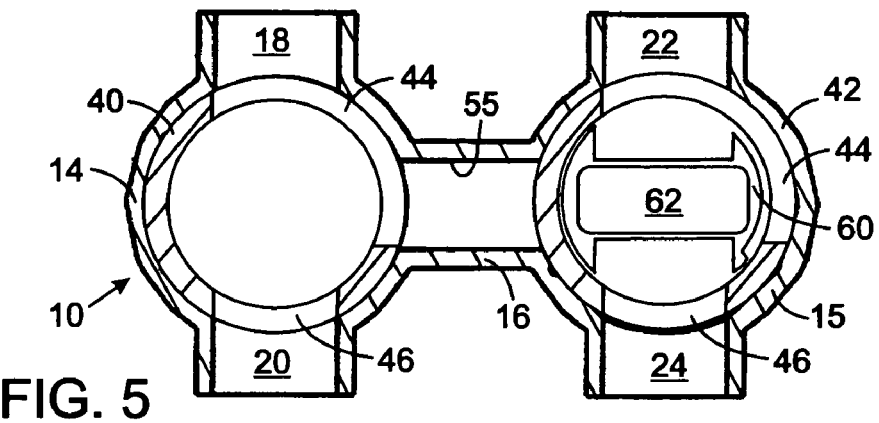
FIG. 5 is a horizontal cross-sectional view through the assembled bypass valve in the water treatment service position.

When the two knobs 36 and 37 are rotated into the position shown in FIG. 1, the first and second valve elements 40 and 42 are rotated into a "service" position depicted in FIG. 5. At this time, the first valve element 40 is in a first position and the second valve element 42 is in a third position. Here the first aperture 44 of the first valve element 40 communicates with the inlet 18 and the second aperture 46 in that valve element aligns with the untreated water outlet 20, thereby conveying fluid from the water supply to the water treatment apparatus. In this state of the bypass valve 10, the first aperture 44 of the second valve element 42 communicates with the treated water inlet 24 and that valve element's second aperture 46 opens into the bypass valve outlet 22. Thus fluid is conveyed from the treated water inlet 24 to the bypass valve outlet 22. The flow of that fluid is measured by the turbine 62 and the associated Hall effect sensor 66. Note that a solid portion of the second valve element 42 closes a fluid passage 55 through the bridge 16, thereby preventing water from flowing between the first and second housings 14 and 15.

Figure 6:
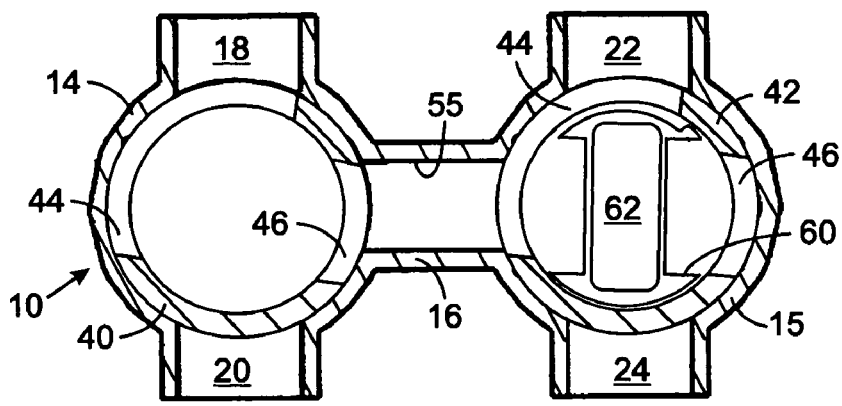
FIG. 6 is a horizontal cross-sectional view through the assembled bypass valve in the bypass position.

When the knobs 36 and 37 are rotated counter-clockwise 90 degrees from the orientation shown in FIGS. 1 and 5, the first and second valve elements 40 and 42 are rotated the same amount into the "bypass" position shown in FIG. 6. Now, the first valve element 40 is in a second position and the second first valve element 42 is in a fourth position. In this orientation, the first aperture 44 of the first valve element 40 communicates with both the inlet 18 and the bridge passage 55. A solid portion of the first valve element 40 closes the untreated water outlet 20. The two apertures 44 and 46 of the second valve element 42 communicate with the bridge passage 55 and the outlet 22. The solid portion of the second valve element 42 closes the treated water inlet 24. Thus in the "bypass" position, water from the inlet 18 is conveyed through the bridge passage 55 directly to the outlet 22 so that untreated water is supplied to the building. The water flows around the turbine 62 which thus does not spin in the bypass position. In this state, both of the water treatment apparatus connections 20 and 24 are closed so that the apparatus can be repaired or have maintenance performed on it.

Figure 7:
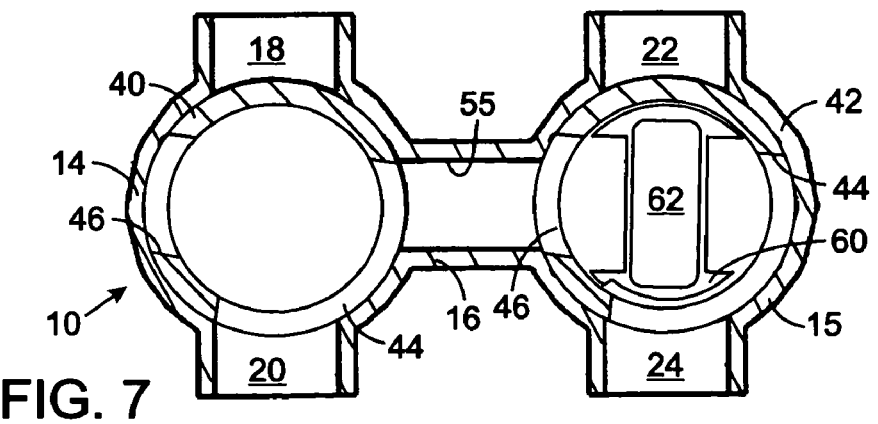
FIG. 7 is a horizontal cross-sectional view through the assembled bypass valve in the closed position.

If from the "service" position shown in FIG. 5, the knobs 36 and 37 are rotated clockwise 90 degrees, the first and second valve elements 40 and 42 are rotated counter-clockwise by that amount into the closed positions shown in FIG. 7. Now, the first valve element 40 is in a fifth position and the second first valve element 42 is in a sixth position. In this state, solid portion of the first valve element 40 closes the bypass valve inlet 18 and the solid portion of the second valve element 42 closes the outlet 22. Now, not only is the water treatment apparatus disconnected from the plumbing pipes connected to the inlet 18 and the outlet 22, but water is prevented from flowing through the bypass valve 10 between the inlet and the outlet. As a consequence in this state, the bypass valve is fully closed as no fluid can flow through it.

The fully closed state allows a cap 26 or 28 and internal components of the bypass valve to be removed for maintenance. With reference to FIGS. 3 and 4, the tight fit of the cross member 61 on the flow meter cage 60 into the notch 63 of the driver 38 pulls the flow meter cage and turbine 62 out of the second valve member when the second cap 28 is removed from the second housing 15. However, the tight engagement of the first and second valve elements 40 and 42 with the inside surface of the respective first and second housings 14 and 15, provided by each sealing ring 48, retains the valve elements in those housings and maintains closure of the associated inlet or outlet 18 or 22.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A bypass valve for a water treatment system comprising:
a body having a first chamber with a first opening, a second chamber connected by a bridge passage to the first chamber and having a second opening, an inlet that opens into the first chamber to receive untreated water, an untreated water outlet that opens into the first chamber, a treated water inlet that opens into the second chamber, and an outlet that opens into the second chamber and through which treated water flows;

a first valve element rotatably received in the first chamber and having a first position in which the inlet is connected to the untreated water outlet, and a second position in which the inlet is connected to the bridge passage and disconnected from the untreated water outlet, wherein the first valve element is a tube having an open end, a cavity with an opening at the open end, and a curved outer surface with a first aperture and a second aperture there through into the cavity;

a second valve element rotatably received in the second chamber and having a third position in which the treated water inlet is connected to the outlet, and a fourth position in which the outlet is connected to the bridge passage and disconnected from the untreated water outlet, wherein at least one of the first valve element in the first position and second valve element in the third position blocks flow of water through the bridge passage, wherein the second valve element is a tube having an open end, a cavity with an opening at the open end, and a curved outer surface with a first aperture and a second aperture there through into the cavity;

a sensor in one of the first chamber and the second chamber, wherein the sensor produces an indication of how much fluid flows through the bypass valve;

a first assembly comprising a first cap removably attached to the body thereby closing the first opening, and a first valve operator extending through a first hole in the first cap and engaging the open end of the first valve element, the first valve operator being rotatable with respect to the first cap to rotate the first valve element within the first chamber, wherein upon removal of the first cap from the body, the first valve operator disengages the first valve element which remains in the first chamber; and a second assembly comprising a second cap removably attached to the body thereby closing the second opening, and a second valve operator extending through a second hole in the second cap and engaging the open end of the second valve element, the second valve operator being rotatable with respect to the second cap to rotate the second valve element within the second chamber, wherein upon removal of the second cap from the body, the second valve operator disengages the second valve element which remains in the second chamber;

wherein in each of the first valve element and the second valve element, the first aperture extends more than 90 degrees around the curved outer surface and the second aperture is spaced around the curved outer surface from the first aperture.

2. The bypass valve as recited in claim 1 wherein the first valve element has a fifth position in which flow of water through the inlet is blocked; and the second valve element has a sixth position in which flow of water through the outlet is blocked.

3. The bypass valve as recited in claim 1 wherein each of the first valve element and the second valve element further comprises an annular seal located on a section of the curved outer surface between the first aperture and the second aperture.

4. The bypass valve as recited in claim 1 wherein the sensor comprises a turbine rotatably contained within one of the first valve element and the second valve element; and a transducer that responds to rotation of the turbine by producing an electrical signal indicating fluid flow through the bypass valve.

5. The bypass valve as recited in claim 1 wherein the sensor comprises a turbine with a magnet attached thereto and rotatably received within one of the first valve element and the second valve element; and a Hall effect sensor that in response to the magnet produces an electrical signal indicating fluid flow through the bypass valve.

6. The bypass valve as recited in claim 1 wherein:

the first valve operator comprises a manually operable first member outside the body with a first portion extending through the first hole and rotatable with respect to the first cap, the first valve operator further including a first driver secured to the first portion and releasably engaging the open end of the first valve element, and the second valve operator comprises a manually operable second member outside the body with a second portion extending through the second hole and rotatable with respect to the second cap, the second valve operator further including a second driver secured to the second portion and releasably engaging the open end of the second valve element.

7. A bypass valve for a water treatment system comprising:

a body having a first chamber with a first opening, a second chamber connected by a bridge passage to the first chamber and having a second opening, an inlet that opens into the first chamber to receive untreated water, an untreated water outlet that opens into the first chamber, a treated water inlet that opens into the second chamber, and an outlet that opens into the second chamber and through which treated water flows;

a first valve element rotatably received in the first chamber and having a first position in which the inlet is connected to the untreated water outlet, and a second position in which the inlet is connected to the bridge passage and disconnected from the untreated water outlet;

a second valve element rotatably received in the second chamber and having a third position in which the treated water inlet is connected to the outlet, and a fourth position in which the outlet is connected to the bridge passage and disconnected from the untreated water outlet, wherein at least one of the first valve element in the first position and second valve element in the third position blocks flow of water through the bridge passage;

a sensor located in one of the first valve element and the second valve element and producing an indication of how much fluid flows through the bypass valve;

a first assembly comprising a first cap removably attached to the body thereby closing the first opening, and a first valve operator extending through the first cap and engaging the first valve element, the first valve operator being rotatable with respect to the first cap to rotate the first valve element within the first chamber, wherein upon removal of the first cap from the body, the first valve operator disengages the first valve element which remains in the first chamber; and a second assembly comprising a second cap removably attached to the body thereby closing the second opening, and a second valve operator extending through the second cap and engaging the second valve element, the second valve operator being rotatable with respect to the second cap to rotate the second valve element within the second chamber, wherein upon removal of the second cap from the body, the second valve operator disengages the second valve element which remains in the second chamber;

wherein the sensor engages the first or second valve operator and is removable from the body while both of the first valve element and the second valve element remain in the first and second chambers.

8. The bypass valve as recited in claim 7 wherein the sensor comprises a turbine rotatably contained within one of the first valve element and the second valve element; and a transducer that responds to rotation of the turbine by producing an electrical signal in response to rotation of the turbine.

9. The bypass valve as recited in claim 7 wherein the sensor comprises a turbine with a magnet attached thereto and rotatably received within one of the first valve element and the second valve element; and a Hall effect sensor that in response to the magnet produces an electrical signal indicating fluid flow through the bypass valve.

10. The bypass valve as recited in claim 7 wherein the first valve element has a fifth position in which flow of water through the inlet is blocked; and the second valve element has a sixth position in which flow of water through the outlet is blocked.

11. The bypass valve as recited in claim 7 wherein each of the first valve element and the second valve element has a tubular shape with a curved outer surface and has an elongated first aperture that extends more than 90 degrees around the curved outer surface and a second aperture spaced around the curved outer surface from the first aperture.

12. The bypass valve as recited in claim 11 wherein each of the first valve element and the second valve element further comprises an annular seal located on a section of the curved outer surface between the first aperture and the second aperture.

13. The bypass valve as recited in claim 7 wherein:
the first valve operator comprises a manually operable first member outside the body with a first portion extending through a first hole in the first cap, and a first driver secured to the first portion and engaging the first valve element, wherein the first valve operator is movable with respect to the first cap, and
the second valve operator comprises a manually operable second member outside the body with a second portion extending through a second hole in the second cap, and a second driver secured to the second portion and engaging the second valve element, wherein the second valve operator is movable with respect to the second cap.

14. The bypass valve as recited in claim 13 wherein:
one of the first driver and the first valve element has a first key and the other of the first driver and the first valve element has a first recess within which the first key is received; and
one of the second driver and the second valve element has a second key and the other of the second driver and the second valve element has a second recess within which the second key is received.

15. The bypass valve as recited in claim 13 wherein
the sensor is coupled to one of the first driver and the second driver, and wherein removal of the one of the first cap and the second cap associated with the one of the first driver and the second driver results in removal of the sensor from the body.

16. The bypass valve as recited in claim 1 wherein the sensor is located within one of the first valve element and the second valve element.

17. The bypass valve as recited in claim 1 wherein removal of one of the first cap and the second cap enables removal of at least a portion of the sensor from the body without removing either of the first valve element and the second valve element from the body.

* * * * *

UNITED STATES PATENT AND TRADEMARK OFFICE
CERTIFICATE OF CORRECTION

PATENT NO. : 7,610,931 B2
APPLICATION NO. : 11/349755
DATED : November 3, 2009
INVENTOR(S) : Wittig et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

Signed and Sealed this

Twelfth Day of October, 2010

David J. Kappos
*Director of the United States Patent and Trademark Office*